(12) United States Patent
Sani et al.

(10) Patent No.: US 7,948,214 B2
(45) Date of Patent: May 24, 2011

(54) METHOD AND APPARATUS FOR CHARGING BATTERIES

(75) Inventors: Andrea Sani, Ferrara (IT); Michele Benedetti, Eugene, OR (US)

(73) Assignee: Datalogic Scanning Group S.R.L., Lippo Di Calderara Di Reno - BO (IT)

( * ) Notice: Subject to any disclaimer, the term of this patent is extended or adjusted under 35 U.S.C. 154(b) by 117 days.

(21) Appl. No.: 12/305,278

(22) PCT Filed: Jun. 26, 2007

(86) PCT No.: PCT/EP2007/056358
§ 371 (c)(1),
(2), (4) Date: Dec. 17, 2008

(87) PCT Pub. No.: WO2008/000735
PCT Pub. Date: Jan. 3, 2008

(65) Prior Publication Data
US 2009/0278508 A1 Nov. 12, 2009

(30) Foreign Application Priority Data
Jun. 30, 2006 (EP) .................................. 06116489

(51) Int. Cl.
H02J 7/00 (2006.01)
(52) U.S. Cl. ....................................... 320/162; 320/106
(58) Field of Classification Search .......... 320/162–164, 320/106
See application file for complete search history.

(56) References Cited

U.S. PATENT DOCUMENTS

| 5,572,110 | A | * | 11/1996 | Dunstan | 320/106 |
| 5,684,382 | A | | 11/1997 | Fritz et al. | |
| 5,773,963 | A | * | 6/1998 | Blanc et al. | 320/145 |
| 5,783,998 | A | | 7/1998 | Nakajou et al. | |
| 5,982,148 | A | | 11/1999 | Mercer | |
| 6,066,939 | A | | 5/2000 | Nagai et al. | |
| 6,479,968 | B1 | | 11/2002 | Pozsgay et al. | |

OTHER PUBLICATIONS

International Search Report for corresponding International Application No. PCT/EP2007/056358 dated Sep. 24, 2007.

* cited by examiner

*Primary Examiner* — Edward Tso
*Assistant Examiner* — Ramy Ramadan
(74) *Attorney, Agent, or Firm* — Duane Morris LLP

(57) ABSTRACT

A method for charging batteries, in particular lithium batteries, includes the steps of connecting a battery electrically to a battery-charging apparatus, dispensing electric power to the battery by means of the battery-charging apparatus, and regulating the electric current and voltage dispensed by the battery-charging apparatus to the battery. The regulating step includes the steps of detecting the voltage at the terminals of the battery and regulating the voltage dispensed by the battery-charging apparatus, during a phase of constant-voltage battery charging, depending on the voltage detected at the terminals of the battery, to compensate for parasitic voltage drops existing between the battery (1) and the battery-charging apparatus.

16 Claims, 6 Drawing Sheets

METHOD AND APPARATUS FOR CHARGING BATTERIES

FIELD OF THE INVENTION

The present invention relates to a method and an apparatus for charging batteries, in particular lithium batteries.

BACKGROUND OF THE INVENTION

The procedure for charging a lithium battery is conducted in two phases: a first constant-current phase, during which the charging current is maintained at a preset value and the voltage at the terminals of the battery increases progressively, until it reaches a preset voltage value and a second constant-voltage phase, in which the voltage is kept at said preset value whilst the charging current decreases progressively, until battery charging is completed, which is considered to have been achieved when the charging current reaches a preset value, equal, for example, to about 1/10 of the intensity of the charging current in the constant-current charging phase.

In the aforementioned charge procedure, the voltage applied to the terminals of the battery in the constant-voltage charging phase is a critical factor, because permitted variation in voltage with respect to said preset value is very small, of the order of 1%.

Voltage that is more than 1% below the preset charge voltage leads to a noticeable prolongation of charge time, with the further risk of an incomplete charge. If the charge voltage exceeds the preset value by more than 1% there is the risk of drastically decreasing the life of the battery and of irreversible damage to the battery, fire and even explosion of the battery.

An apparatus for charging lithium batteries therefore has to be able to monitor and regulate with great precision the charge voltage, maintaining it within the aforementioned limits.

From the prior art numerous devices are known that manage the entire recharging process, normally by means of an internal finite-state machine.

A problem that is common to prior-art battery chargers is that in the circuit that connects the battery to the battery charger there are resistances that introduce voltage drops that alter the charge voltage read by the battery charger, thus preventing precise monitoring of the charge voltage required by the lithium batteries. These voltage drops will be indicated henceforth as parasitic voltage drops.

This drawback is particularly marked in the case of portable devices supplied by lithium batteries, for example manual readers of encoded information (such as optical codes such as barcodes, stacked codes, two-dimensional codes, and colour codes or printed characters, stamps, logos, signatures or electronic labels for radiofrequency identification, so-called "tags") or for acquiring images of "cordless" type, so-called "guns" for the shape of the grippable casing. In the present context the term "gun" is intended to indicate all grippable reading devices without cord ("cordless") that communicate with a base or a remote computer by means of radio waves and those provided with a memory for storing data that are then downloaded into the base memory, which are also known by the term "batch".

Typically, the "guns" are charged by means of an external recharging device, a so-called "cradle" that is suitable for receiving and housing the "gun" for exchanging data therewith (and thus acting as a base) and providing it with the electric power necessary for recharging. The contacts or connectors by means of which an electric connection is established between the "gun" and the "cradle" and the internal cables of the "gun" and the "cradle" have electrical resistances that causes parasitic voltage drops of significant value in the connection between the battery charger housed in the "cradle" and the battery housed in the "gun".

SUMMARY OF THE INVENTION

The object of the present invention is to provide a method and an apparatus for charging batteries, in particular lithium batteries, that is able to eliminate the influence of voltage drops generated by the electrical connections between the apparatus and the battery to be recharged.

According to a first aspect of the present invention a method is provided for charging batteries, in particular lithium batteries, comprising the phases of electrically connecting a battery to a battery-charging apparatus, dispensing electric power to the battery by means of said battery-charging apparatus, regulating the electric current and voltage dispensed by said battery-charging apparatus to the battery, characterised in that said regulating comprises the phases of detecting the voltage at the terminals of the battery and regulating the voltage dispensed by said battery-charging apparatus, in a constant-voltage battery charging phase, depending on the voltage detected at the terminals of the battery, to compensate for parasitic voltage drops existing between said battery and said battery-charging apparatus.

According to another aspect of the present invention, an apparatus is provided for charging batteries, in particular lithium batteries, comprising dispensing means of electric power for dispensing electric power to a battery, electric connecting means for connecting electrically said apparatus to said battery, regulating means for regulating the electric current and the electric voltage dispensed by said apparatus to said battery, said battery being connected to detecting means suitable for detecting the voltage at the terminals of the battery, characterised in that said apparatus is associable with controlling means suitable for being connected to said detecting means and for interacting with said regulating means, said controlling means being suitable for controlling said regulating means to regulate the intensity of the voltage dispensed to the battery depending on said voltage detected at the terminals of the battery, in a phase of charging the battery with constant voltage.

Owing to the invention, the influence of the voltage drops in the connection circuits between the battery-charging apparatus and the battery to be charged is completely eliminated, using the voltage at the battery terminals as a feedback signal for piloting the regulating means so as to regulate the voltage and the current dispensed by the battery charger, keeping the voltage at the terminals of the battery within the permissible limits during the entire charging procedure.

BRIEF DESCRIPTION OF THE DRAWINGS

An example of an embodiment of the invention will be disclosed below, by way of non-limitative example, with reference to the attached drawings, in which.

DETAILED DESCRIPTION

Figure 1:
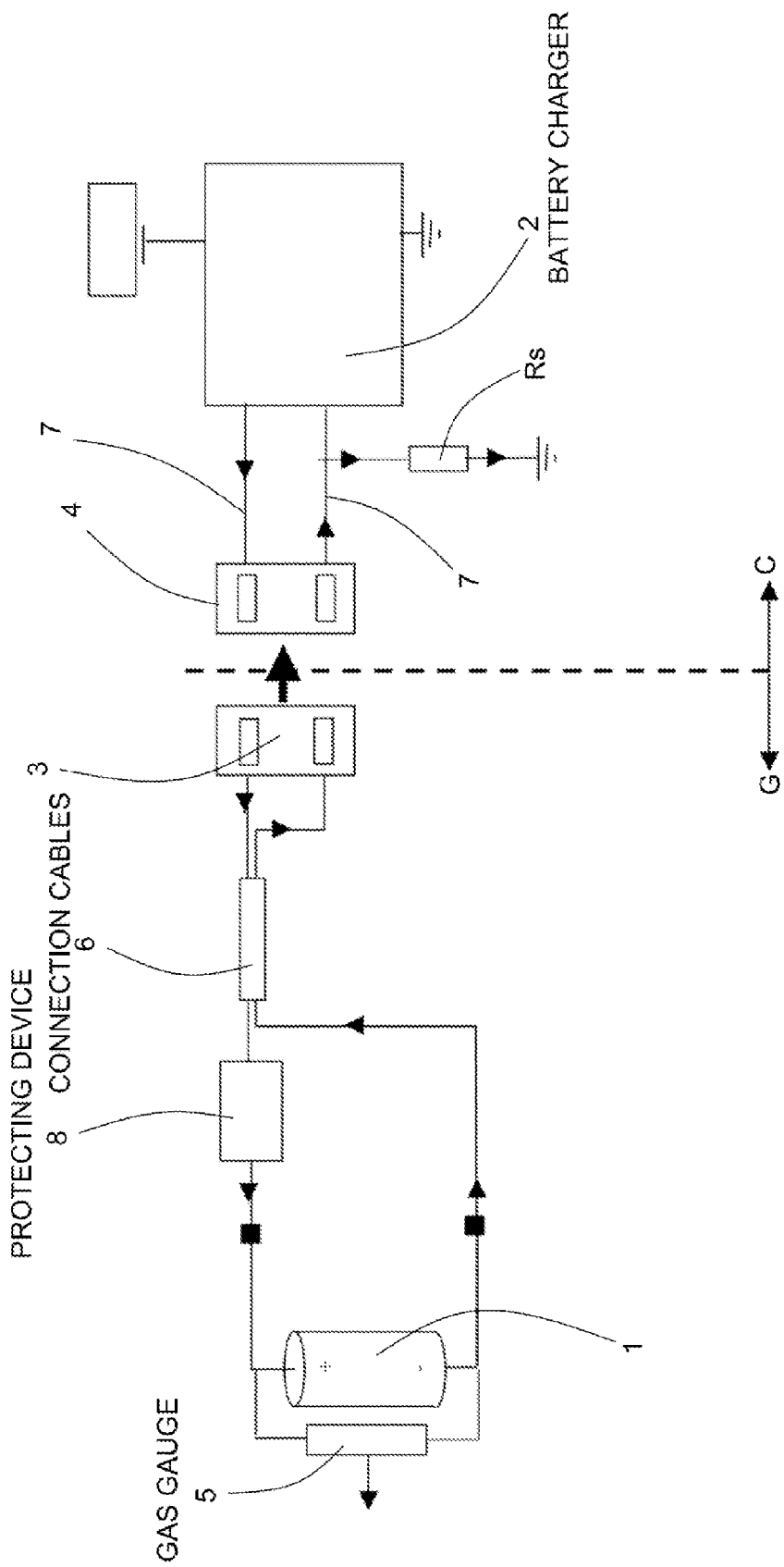
FIG. 1 a simplified wiring diagram that illustrates the connection between a battery and a prior-art battery charger.

In FIG. 1 there is shown a wiring diagram that illustrates the connection between a battery 1 and a battery charger 2 according to the prior art, in the case for example of a battery housed in a reading device G of encoded information or images (FIG. 6), that is inserted for recharging into an appropriate charging device C (FIG. 7), containing the battery charger, suitable for housing the reading device G and connecting electrically therewith through suitable contacts 4, suitable for coupling with corresponding contacts 3 provided on the reading device G. Instead of the contacts 3 and 4 respective connectors can be provided on the devices G and C. In addition to the contacts 3 and 4 on the devices G and C there are also provided other contacts through which the "gun" and the "cradle" exchange data (in particular data relating to read information) and control signals.

The battery 1 is normally coupled with an integrated circuit 5, called "gas gauge", the terminals of which are connected to the terminals of the battery 1. The integrated circuit 5 is used to measure the quantity of electric charge supplied to the battery 1 during the charging procedure and the quantity of electric charge dispensed by the battery 1 during the use thereof, for providing an indication of degree of progress of charging procedure and of the quantity of residual charge of the battery 1 during use thereof. In the integrated circuit 5 characteristic data of the battery can furthermore be stored such as, for example, the serial number, battery capacity in A/h and diagnostic data on the battery.

The battery 1 is connected, by means of appropriate cables 6, for example of "flat" type, to the contacts 3 of the reading device G, that, when the latter is inserted into the recharging device C, couple with the contacts 4 of the recharging device, which, by means of suitable cables 7, are connected to the battery charger 2. Between the contacts 3 of the reading device G and the battery 1 there can be arranged a protective device 8 for protecting the battery 1. The output of the battery charger 2 is connected to current sensing resistor ("sensing" resistor) Rs, that enables the current dispensed by the battery charger 2 to be detected, which is absorbed by the battery 1. The resistor Rs has been shown in this figure as being separated from the battery charger 2, but it can also be part thereof functionally.

The connecting cables 6 and 7, the contacts 3 and 4 and the protecting device 8 generate parasitic voltage drops between the battery charger 2 and the battery 1. Owing to these voltage drops, the voltage applied to the terminals of the battery 1 is lower than the voltage dispensed by the battery charger 2.

Figure 2:
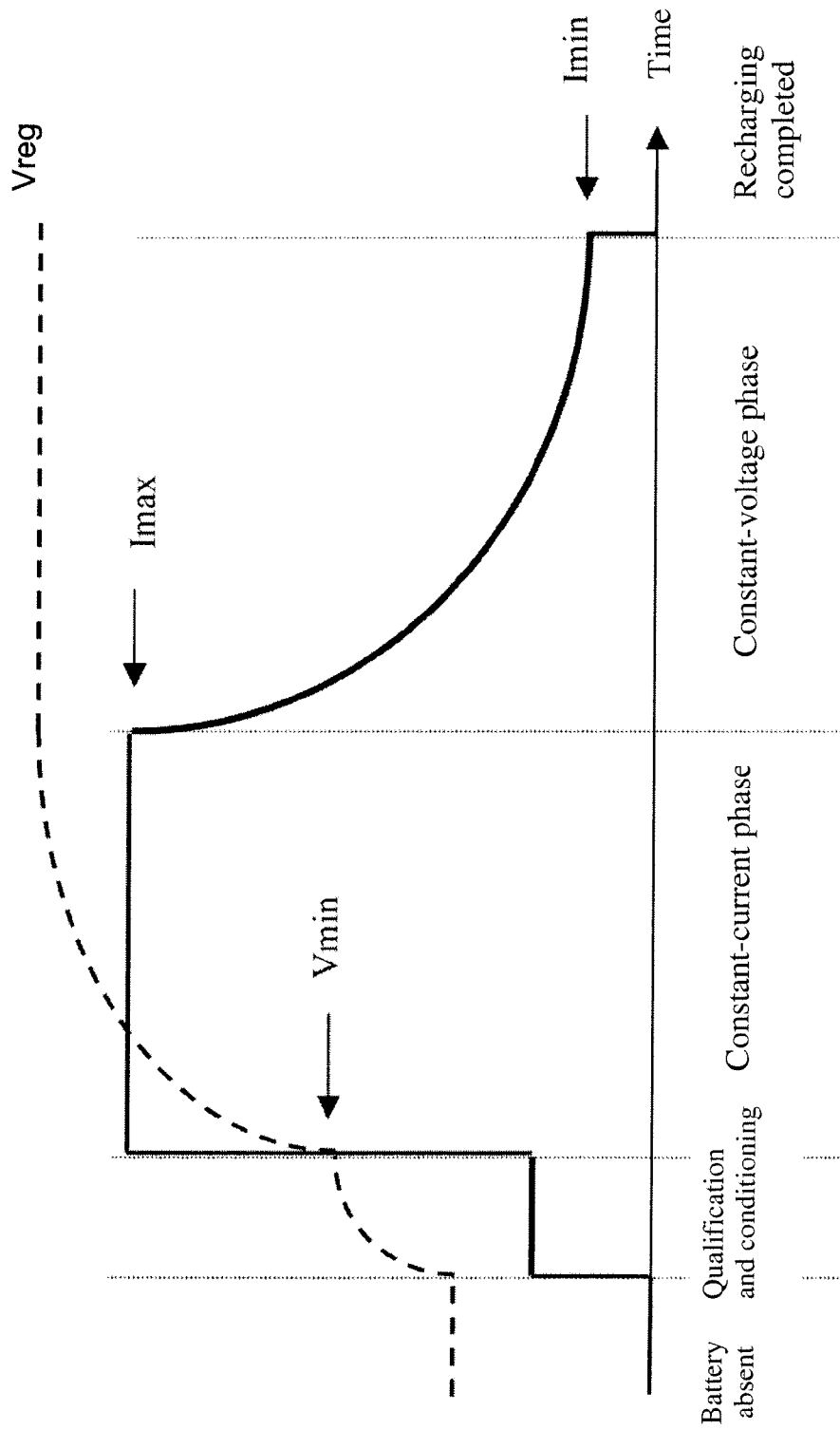
FIG. 2 is a diagram that illustrates the ideal charging procedure for a lithium battery.
Figure 3:
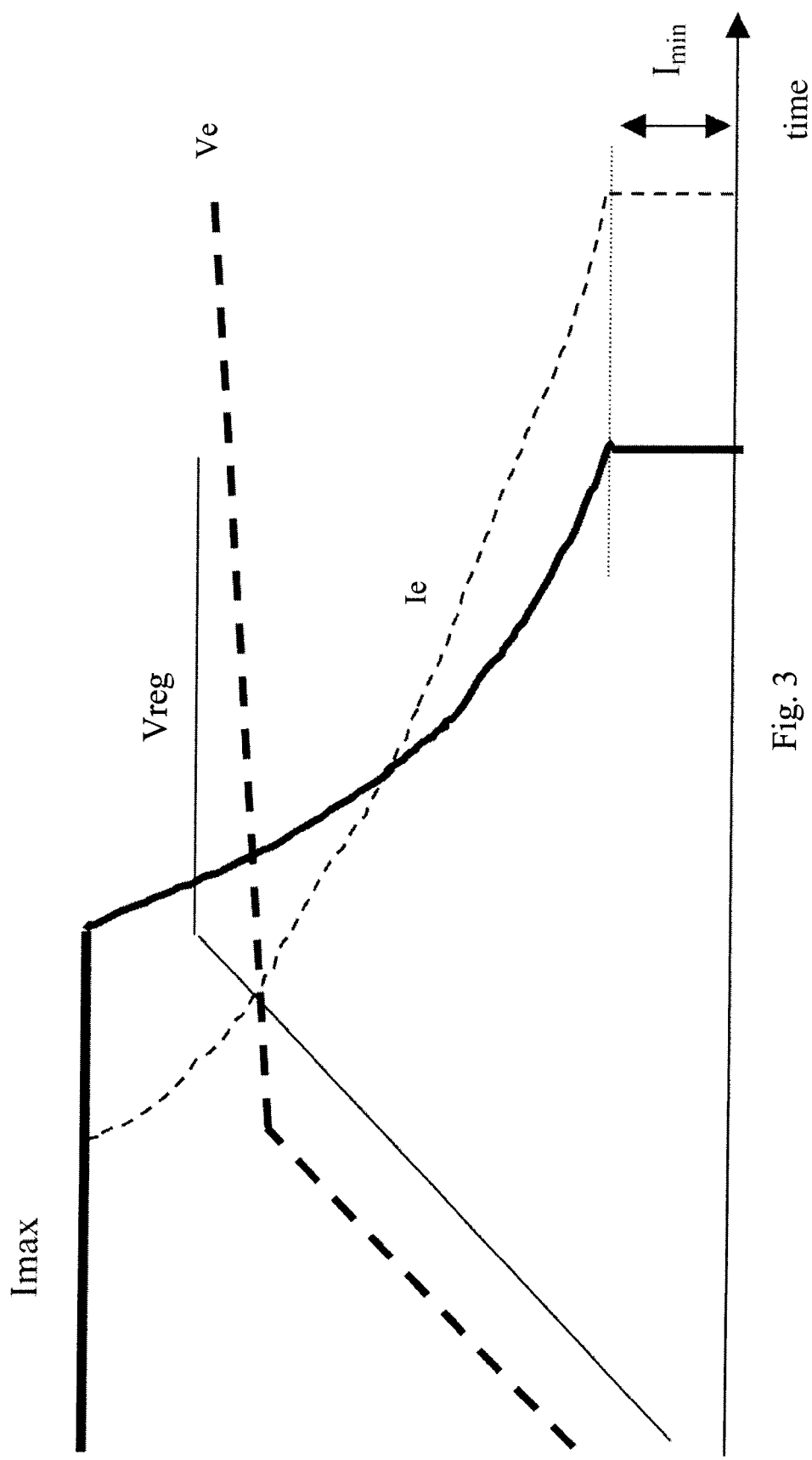
FIG. 3 is a diagram that illustrates the influence of the parasitic voltage drops in the charge procedure for charging a lithium battery.

FIGS. 2 and 3 illustrate the effect of the parasitic voltage drops on the battery 1 charging procedure, comparing the voltage and current variations during the charging procedure in the case of an ideal charging procedure (FIG. 2), i.e. in the absence of parasitic voltage drops, and of an actual charging procedure (FIG. 3), in the presence of parasitic voltage drops.

Reference is now made to FIG. 2, in which the current that circulates in the battery during the charging procedure is indicated by a continuous line, whilst the voltage at the terminals of the battery is indicated by a dotted line.

When a lithium battery 1 is exhausted, at the terminals thereof there is a low voltage, less than or equal to approximately 3V.

At the moment in which it is connected to the battery charger 2, the latter goes to an initial qualification and then conditioning state that is necessary for managing the parameters inside the battery charger 2 and to take the voltage on the battery 1 to a minimum value Vmin such as to be able to initiate the recharging phase.

Subsequently, the battery charger 2 goes to a constant-current phase, characterised by the dispensing of a current Imax of preset and constant value, said preset value depending on the capacity of the battery. In this phase the battery charger 2 acts as a constant-current generator and the voltage at the terminals of the battery increases progressively, until it reaches a preset value Vreg, which for lithium batteries is typically 4.1 or 4.2 V.

When the voltage at the terminals of the battery 1 reaches the value Vreg, the battery charger 2 enters a constant-voltage phase, characterised by the dispensing of a constant and very precise voltage equal to said preset value Vreg; typically maximum tolerances on Vreg of approximately 1% are accepted by lithium batteries.

Lower voltages do not allow complete recharging whilst greater values, as previously said, may damage the battery 1, or even cause it to catch fire or explode.

During this phase the battery charger 2 acts as a constant-voltage generator and the current absorbed by the battery decreases progressively due to the increase in the battery impedance until it reaches a predefined minimum value Imin, the equivalent of about 10% of Imax, when which has been reached recharging can be considered to be complete.

Reference is now made to FIG. 3, relating to a charging procedure in the presence of parasitic voltage drops, in which the current Ie that circulates in the battery 1 during the charging procedure, in the constant-current phase, is indicated by the thin dotted line, the voltage Ve at the terminals of the battery 1 is indicated by a thick dotted line. The current circulating in the battery 1 in the ideal case of an absence of parasitic voltage drops is indicated by a thick continuous line, whilst the corresponding voltage at the terminals of the battery 1 is indicated by a continuous thin line.

Owing to the parasitic voltage drops, the voltage Ve at the terminals of the battery 1 will be lower than the voltage dispensed by the battery charger 2. This means that the constant-current charging phase will be interrupted before the voltage to the terminals of the battery reaches the preset value Vreg, upon reaching which the constant-voltage charging phase is proceeded with. Furthermore, the constant-voltage charging phase will occur at a voltage Ve that is lower than the preset value Vreg. This all entails an incomplete battery 1 charge, or a significant prolongation of charging time.

Figure 4:
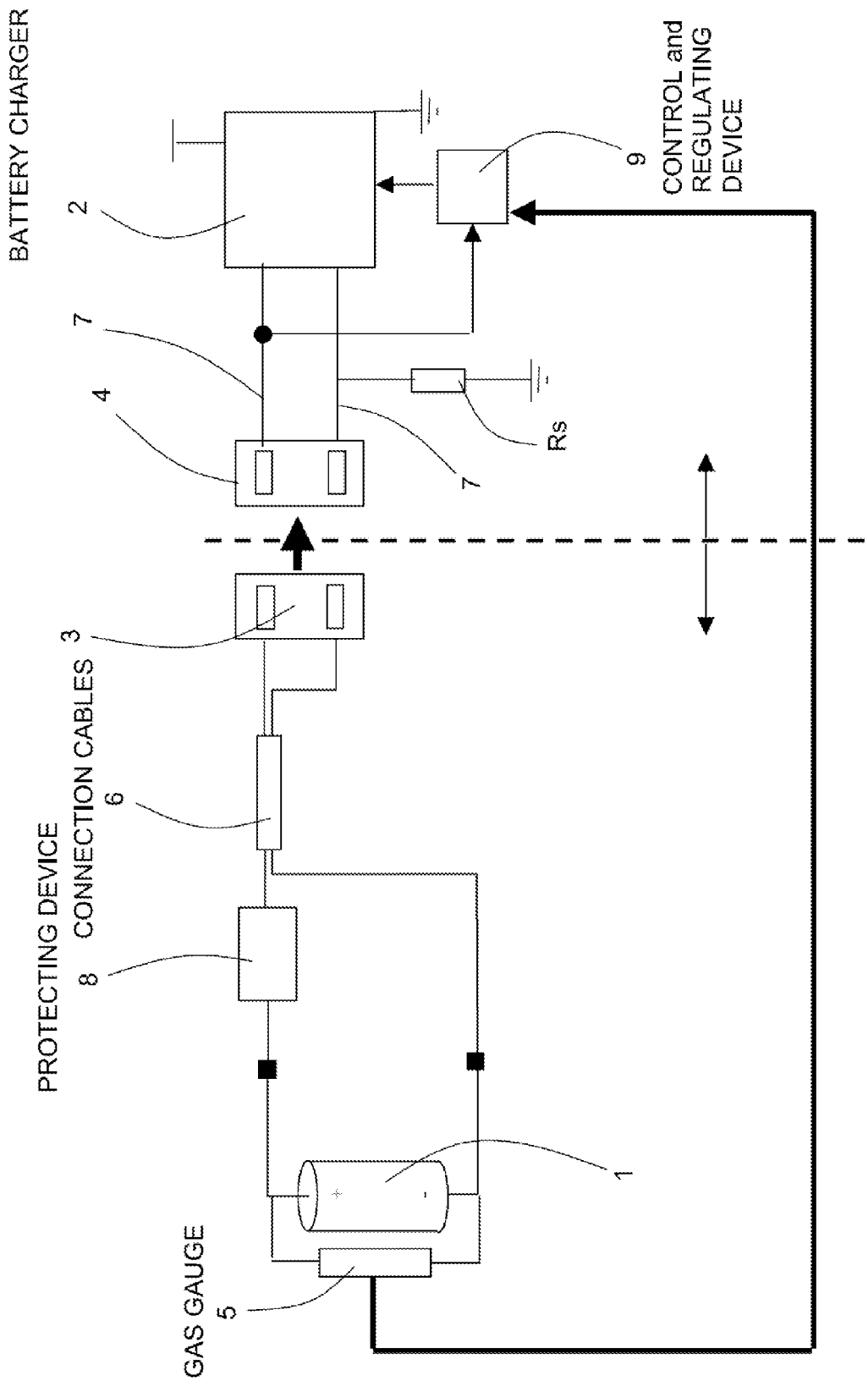
FIG. 4 is a simplified wiring diagram that illustrates the connection between a battery and a battery charger according to the present invention.

In FIG. 4 there is illustrated a simplified wiring diagram like the one in FIG. 1, but relating to the connection between a battery 1 and a battery charger 2 according to the invention.

In this case the battery charger 2 is associated with a control and regulating device 9 that is connected to the integrated circuit 5 (so-called "gas gauge") coupled with the battery 1, in such a way as to read the voltage values at the terminals of the battery 1 and the current circulating in the battery, detected by the integrated circuit 5, and to regulate the voltage dispensed by the battery charger 2 depending on the voltage detected by the integrated circuit 5 at the terminals of the battery. In other words, for example, the constant-current charging phase is maintained until the voltage Ve at the terminals of the battery 1 read by the integrated circuit 5 and transmitted to the control and regulating device 9 equals the preset value Vreg. In the constant-voltage charging phase, if the voltage Ve detected at the terminals of the battery is greater than the constant-voltage charging value Vreg, the control and regulating device 9 decreases the voltage dispensed by the battery charger 2. If, on the other hand, the voltage Ve at the terminals of the battery 1 is less than Vreg, the control and regulating device 9 increases the voltage dispensed by the battery charger 2.

Owing to the presence of the control and regulating device 9 connected to the integrated circuit 5 associated with the battery 1 it becomes possible to perform a charging procedure in which the voltage dispensed by the battery charger 2 is modified in such a way as to compensate automatically for the parasitic voltage drops that exist between the battery charger 2 and the battery 1.

The voltage and current values of the battery 1 detected by the integrated circuit 5 are transmitted in digital form to the control and regulating device 9 by means of suitable corresponding contacts provided on the "gun" and on the "cradle". These signals being digital, they are not influenced by parasitic voltage drops and therefore a measurement of the actual voltage at the terminals of the battery 1 is available for the system formed by the battery charger 2 and by the control and regulating device 9.

Figure 5:
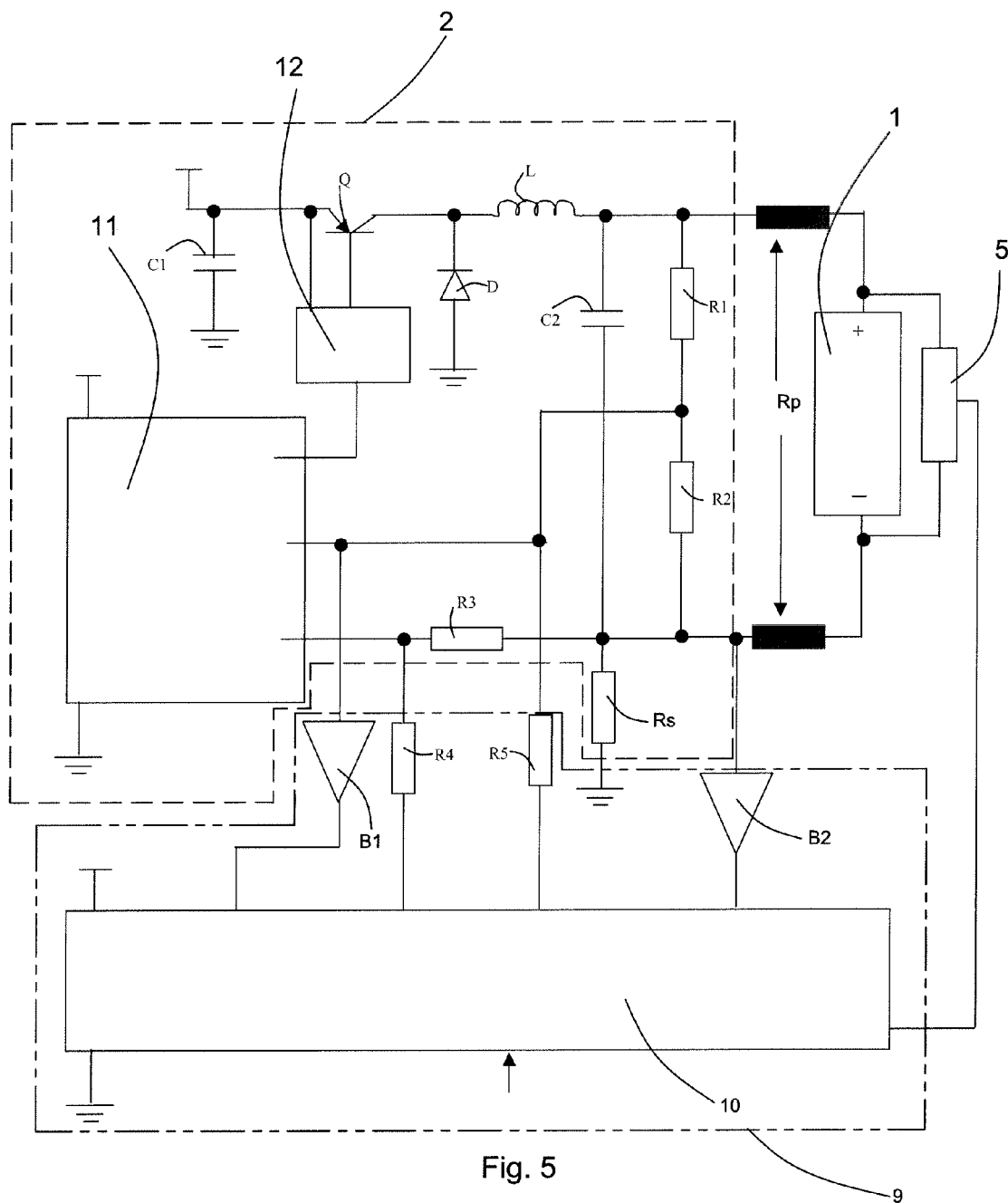
FIG. 5 is a functional wiring diagram of a battery charger according to the present invention.

FIG. 5 is a functional wiring diagram of an apparatus according to the invention for charging batteries.

The battery charger 2 is provided with an integrated control circuit 11, typically comprising a finite state machine, that controls, by means of a "switching" modulating control, a "switching" generator comprising a device 12 controlling an electronic switch Q consisting of a bipolar transistor, MOS or other, an input capacitor C1, a diode D, an inductor L and an output capacitor C2.

At the heads of C2 there is the battery charger output, which connects to the lithium battery by means of the previously disclosed distributed parasitic Rp resistors indicated here in concentrated form.

The "switching" type is disclosed only by way of example; also another type of control can be used as an actuator within the battery charger.

The integrated circuit 11 detects, by means of a voltage divider consisting of two resistances R1 and R2 connected in parallel to the output of the battery charger 2, the voltage dispensed by the battery charger 2; furthermore, the integrated circuit 11 detects, by means of a resistor R3 a signal originating from a low ohm value sensing resistor Rs, that is serially connected between the negative terminal of the battery 1 and ground. The signal originating from the resistor Rs is proportional to the current dispensed by the battery charger 2 and circulating in the battery 1.

The control and regulating device 9 comprises a microprocessor 10 that is connected to the integrated circuit 5 connected to the terminals of the battery and acquires the voltage detected by the integrated circuit 5, i.e. the actual voltage at the terminals of the battery 1, not altered by the parasitic voltage drops.

The control and regulating device 9 furthermore comprises two buffers B1 and B2, two resistances R4 and R5 and two actuators (not shown) that are inside or outside the microprocessor 10 and are active by means of the resistances R4 and R5.

The microprocessor 10 acquires, by means of the buffer B1 connected to the voltage divider constituted by the resistances R1 and R2, the value of the output voltage of the battery charger 2 and, by means of the buffer B2 connected to the sensing resistor Rs, acquires the value of the current absorbed by the battery 1.

The microprocessor 10 furthermore operates on the integrated circuit 11 of the battery charger 2, sending to the integrated circuit 11, by means of an actuator and the resistance R5 associated therewith, a command for regulating the output voltage of the battery charger 2 depending on the actual voltage detected at the terminals of the battery 1, so that the voltage at the terminals of the battery 1 is equal to Vreg in the constant-voltage charging phase, thus eliminating the effects of the parasitic resistances.

The microprocessor 10 furthermore operates on the integrated circuit 11 to prevent the latter, due to the effects of the parasitic resistances, from commanding prematurely the passage from the constant-current charging phase to the constant-voltage charging phase. In fact, the integrated circuit 11 would tend to command a changeover from the constant-current charging phase to the constant-voltage charging phase when the output voltage of the battery charger 2, detected by means of the voltage divider constituted by the resistances R1 and R2 connected in parallel to the output of the battery charger 2, exceeds the value Vreg. However, due to the parasitic voltage drops, the output voltage of the battery charger 2 is greater than the voltage at the terminals of the battery 1, so that the changeover from the constant-current charging phase to the constant-voltage charging phase would occur prematurely, i.e. before the voltage at the terminals of the battery 1 reached the value Vreg. In order to prevent this premature changeover to the constant-voltage charging phase, the microprocessor 10 sends to the integrated circuit 11 a command for keeping it in the constant-current charging phase until the voltage at the terminals of the battery 1 has reached the value Vreg. For example, the microprocessor 10 can, through the actuator and the resistance R5 associated therewith, modify the value of the output voltage of the battery charger 2 read by the integrated circuit 11, in such a way that the output voltage of the battery charger 2 lowers to the point that the voltage read by the integrated circuit 11 does not exceed the value Vreg. The integrated circuit will thus still operate in the constant-current phase. When the voltage at the terminals of the battery equals Vreg the integrated circuit 11 will change over to the constant-voltage charging phase.

Furthermore, the microprocessor 10 can acquire from the integrated circuit 5 information relating to the type of battery 1 to be charged and to the capacity thereof, which information is stored in the integrated circuit 5. On the basis of this information, the microprocessor 10 operates on the integrated circuit 11, by sending to it, through an actuator and the corresponding resistance R4, a command for regulating the charging current depending on the type of battery 1 connected to the battery charger 2.

The microprocessor 10 can be furthermore set up to command a reduction in the charging current dispensed by the battery charger 2, in such a way as to enable the battery charger 2 to perform a so-called low-consumption "maintenance charge", for example in the event that the battery charger supply is not able to supply sufficient amperage for normal charging of the battery 1.

Lastly, the integrated circuit 5 connected to the terminals of the battery 1, can also provide the microprocessor 10 with information on the temperature of the battery 1, so that the microprocessor 10 can operate in such a way as to manage possible anomalous situations, for example by reducing the charging current or interrupting the charging procedure.

Figure 6:
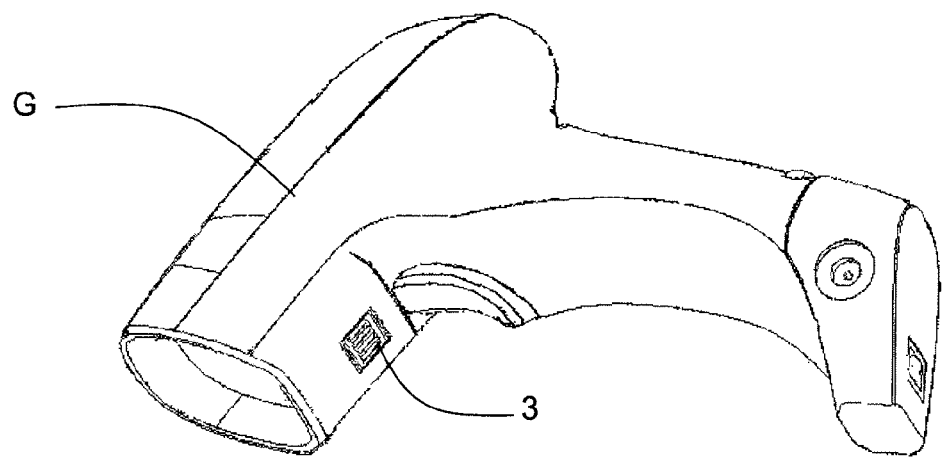
FIG. 6 illustrates a device for reading encoded information supplied by a lithium battery, a so-called "gun", that can be recharged with a recharging apparatus according to the invention.

According to a version, the apparatus 2 provided with the control and regulating device 9 according to the invention can be integrated into a battery-powered portable device G, for example a reader of encoded information or images such as the one shown in FIG. 6, or into any other device powered by lithium batteries. In fact, the presence of the device 9 according to the invention is also advantageous in said portable devices in which, although the battery charger 2 is contained in the same case that contains the battery 1 and is therefore closer to it, in the circuit that connects the battery 1 to the battery charger 2 there are parasitic voltage drops that are not negligible with respect to the nominal charging voltage.

Figure 7:
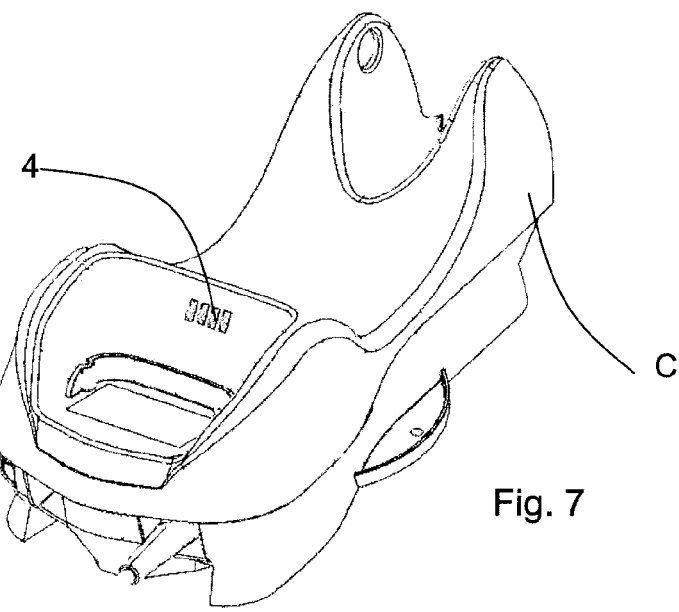
FIG. 7 illustrates a recharging device, a so-called "cradle", suitable for receiving the so-called reading device, to be connected electrically therewith and to provide it with the power necessary for recharging the lithium battery.
Figure 8:
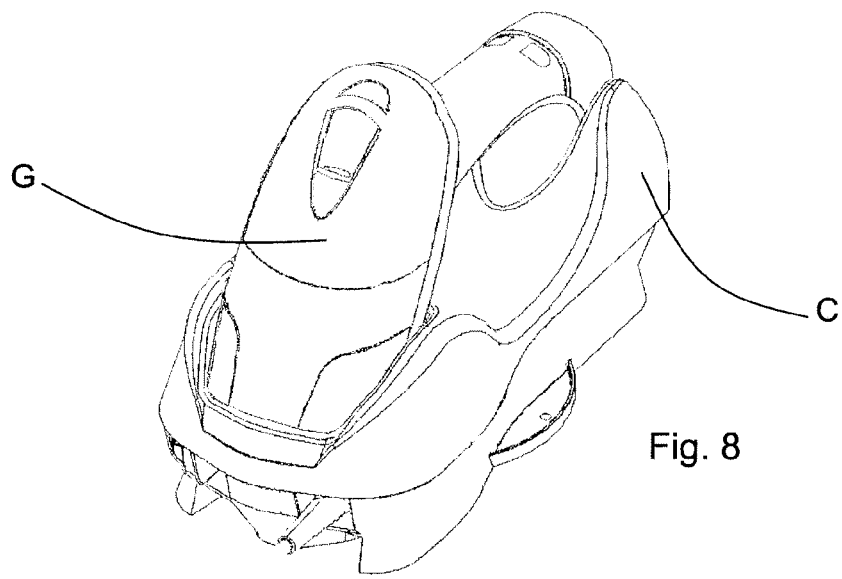
FIG. 8 illustrates the so-called "gun" and "cradle" coupled for recharging the lithium battery of the "gun".

The charging device C illustrated in FIG. 7 can also be realized in such a way as to be able to receive a plurality of portable devices G, for charging respective batteries, or a plurality of single batteries, that are batteries not inserted into any user apparatus. In this case, the charging device C will be provided with a plurality of contacts 4 each of which will be intended to couple with the contacts 3 of a portable device G or with a single battery. Furthermore, the battery charger apparatus 2 integrated into the charging device C can also be operationally associated with a switching device, suitable for connecting the apparatus 2 to a contact 4 at a time of the charging device C, to perform in succession charging of the batteries of a plurality of portable devices G connected to the charging device C or of single batteries, that are batteries not inserted into any user apparatus.

In the practical embodiment, the materials, dimensions and constructional details may be different from those indicated but be technically equivalent thereto without thereby falling outside the scope of protection of the present invention.

What is claimed is:

1. A method for charging batteries comprising the steps of:
   connecting a battery electrically to a battery-charging apparatus;
   dispensing electric power to the battery by means of said battery-charging apparatus; and
   regulating electric current and voltage dispensed by said battery-charging apparatus to the battery, wherein said regulating step comprises the steps of detecting the voltage at terminals of the battery and regulating the voltage dispensed by said battery-charging apparatus, during a constant-voltage battery charging phase, depending on the voltage detected at the terminals of the battery to compensate for parasitic voltage drops existing between said battery and said battery-charging apparatus,
   wherein said connecting step comprises providing contact means of said battery-charging apparatus for dispensing electric power to said battery and wherein said regulating step further comprises providing further contact means for transmitting in digital form said voltage detected at the terminals of the battery to controlling means to regulate the voltage dispensed by said battery-charging apparatus.

2. The method according to claim 1, further comprising the steps of detecting type and capacity of said battery and regulating the current dispensed by said battery-charging apparatus to the battery, during a constant-current charging phase, depending on said capacity.

3. The method according to claim 1, further comprising the step of regulating the current dispensed by said battery-charging apparatus to the battery, during a constant-current charging phase, at a value lower than the current value normally required as based on the capacity of the battery, to perform a low-consumption maintenance recharge of the battery.

4. An apparatus for charging batteries comprising:
   dispensing means of electric power for dispensing electric power to a battery;
   electric connecting means for connecting electrically said apparatus to said battery; and
   regulating means for regulating electric current and electric voltage dispensed by said apparatus to said battery, said battery being connected to detecting means suitable for detecting the voltage at terminals of the battery, said apparatus being associated with controlling means suitable for being connected to said detecting means and for interacting with said regulating means, said controlling means being suitable for controlling said regulating means to regulate the intensity of the voltage dispensed to the battery depending on said voltage detected at the terminals of the battery, during a constant-voltage battery charging phase,
   wherein said apparatus is integrated into a charging device and wherein said electrical connecting means comprises contact means for dispensing electric power to said battery and further contact means for transmitting in digital form said voltage detected at the terminals of the battery from said detecting means to said controlling means.

5. The apparatus according to claim 4, wherein said controlling means comprises a microprocessor.

6. The apparatus according to claim 4, wherein said controlling means is suitable for controlling said regulating means to regulate the intensity of the current dispensed to the battery at a value depending on the capacity of said battery, during a constant-current charging phase of said battery.

7. The apparatus according to claim 6, wherein said controlling means is suitable for controlling said regulating means to regulate the intensity of the current dispensed to the battery, during said constant-current charging phase, at a value lower than said value depending on the capacity of said battery to carry out a maintenance recharge of the battery.

8. The apparatus according to claim 4, wherein said controlling means is suitable for interacting with said regulating means so that the regulating means commands the changeover from a constant-current battery charging phase to a constant-voltage charging phase only when the voltage at the terminals of said battery detected by means of said detecting means reaches a preset value.

9. The apparatus according to claim 4, wherein to the charging device there can be connected electrically at least one portable device supplied by at least one lithium battery.

10. The apparatus of claim 9, wherein the at least one portable device comprises a plurality of portable devices each supplied by at least one lithium.

11. The apparatus according to claim 10, wherein the apparatus is associated with a switching mechanism to be connected electrically in succession to a single portable device of said plurality of portable devices.

12. The apparatus according to claim 9 wherein said at least one portable device is a reading device for reading encoded information.

13. The apparatus according to claim 4, wherein to the charging device there can be connected electrically a plurality of lithium batteries.

14. The apparatus according to claim 13, wherein the apparatus is associated with a switching mechanism for being connected electrically in succession to said lithium batteries.

15. The method of claim 1, wherein the battery is a lithium battery.

16. The apparatus of claim 4, wherein the battery is a lithium battery.

* * * * *